Sept. 27, 1932.    G. C. BOWN ET AL    1,879,839
LUBRICATING BEARINGS
Filed Dec. 16, 1930    2 Sheets-Sheet 1

INVENTORS.
Gilbert C. Bown
Edward J. McCarthy
BY Lancaster, Allwine and Rommel
ATTORNEYS.

Sept. 27, 1932.   G. C. BOWN ET AL   1,879,839
LUBRICATING BEARINGS
Filed Dec. 16, 1930   2 Sheets-Sheet 2

INVENTORS.
Gilbert C. Bown
Edward J. McCarthy
BY Lancaster, Allwine & Rommel
ATTORNEYS.

Patented Sept. 27, 1932

1,879,839

UNITED STATES PATENT OFFICE

GILBERT C. BOWN AND EDWARD J. McCARTHY, OF LONG BEACH, NEW YORK

LUBRICATING BEARINGS

Application filed December 16, 1930. Serial No. 502,776.

This invention relates to improvements in self lubricating bearings.

The primary object of this invention is the provision of an improved lubricated bearing which may find adaptation wherever two parts are relatively rotatable and have relative bearing, the same including an improved arrangement to efficiently lubricate the bearing surfaces of the parts.

A further object of this invention is the provision of an improved means for insuring proper lubrication between the contacting surfaces of relatively rotatable parts of machinery, having particular reference to improved means for causing relatively heavy and viscid grease or other lubricant to enter between the contacting surfaces of the relatively rotatable parts.

A further object of this invention is the provision of an improved bearing of the so-called lubricating type, wherein a lubricant receiving well is formed in one part of a bearing surrounding the other part of the bearing structure, and wherein a relatively heavy loose ring is eccentrically disposed in such relation that it may only contact a peripheral wall of the well within which the ring is received, at one point, and thereby be held spaced from the other part.

A further object of this invention is the provision of an improved bushing for bearing structures, adapted to be used in bearings of the so-called lubricating type, and embodying an improved duct arrangement for the efficient distribution of lubricant between the bearing surfaces of the bearing parts.

Other objects and advantages of this invention will be apparent during the course of the following detailed description.

In the accompanying drawings, forming a part of this specification, and wherein similar reference characters designate corresponding parts throughout the several views, Figure 1 is a view showing a preferred embodiment of the bearing structure in a pulley block, parts being broken away and in section to more clearly designate the cooperating details.

Figure 1:
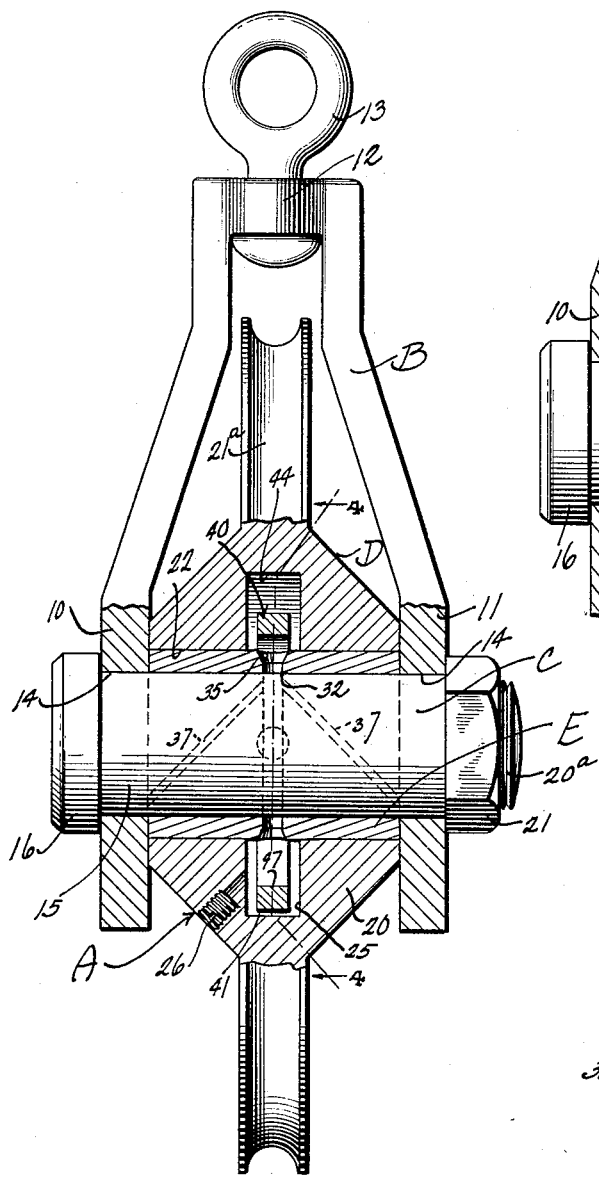
Figure 2:
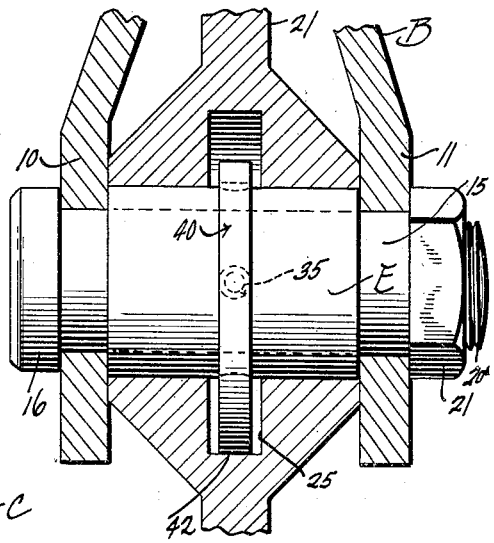
Figure 2 is an enlarged sectional view showing certain details of the improved self-lubricating bearing.
Figure 3:
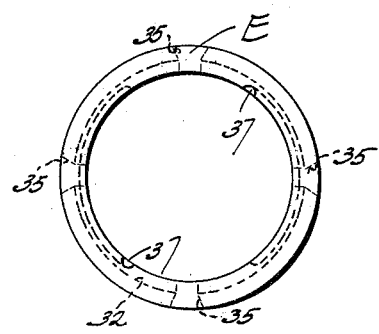
Figure 3 is an end view of an improved type of bearing bushing.

In the drawings, wherein for the purpose of illustration is shown only a preferred embodiment of the invention, and but one specific application of the improved bearing, the letter A may generally designate a pulley block structure, embodying a frame B having a stationary pulley supporting pin or shaft C supported thereby, upon which a sheave or pulley D is rotatably mounted; the latter having therein a bushing E, which together with the pulley D is constructed with an improved self-lubricating means.

It is to be distinctly understood that the improved self-lubricating feature of the invention is not only capable of use in connection with the specific application to a pulley block, as illustrated in this application, but that the details of the lubricating arrangement may be applied to and formed with the parts of any bearing wherein the details may be used to insure efficient lubrication between bearing parts.

In the pulley block A of the drawings, the parts are arranged to provide a pulley block of the heavy duty type, such as is used for lifting and transporting very heavy loads, such as freight, cargo, steel beams, safes, and the like. The frame B is of the inverted substantially U-type, comprising arms 10 and 11 which at their connected ends are relatively convergent and connected by a bight portion 12 wherein an eye 13 is swivelly mounted; the eye of course being adapted to receive the connecting cable or other support. The arms 10 and 11 are transversely apertured at 14 and receive the ends of the pin or shaft C. The pin or shaft C includes a cylindrical metal body portion 15, of uniform diameter. At one end the pin or shaft has a head 16, and at the opposite end the shaft is threaded at 20ª and receives a nut 21 thereon. The shaft or pin may be provided with any approved means to rigidly connect the same to the arms 10 and 11 if desired. The shaft may be of the rotatable type, since the lubricating features of the invention are capable of use having a shaft of a rotatable type.

The pulley or sheave D constitutes the other part of the bearing structure. It consists of a body portion 20, having the grooved pulley wheel flange 21ª annularly surrounding the same. The body is provided with an axial passageway 22 for receiving the bushing E, which is to be considered as part of the pulley to all intents and purposes. The body 20 is provided with an annular well or chamber 25, concentrically surrounding the passageway 22, which receives the lubricating material therein. A filler plug 26 may be provided.

Figure 5:
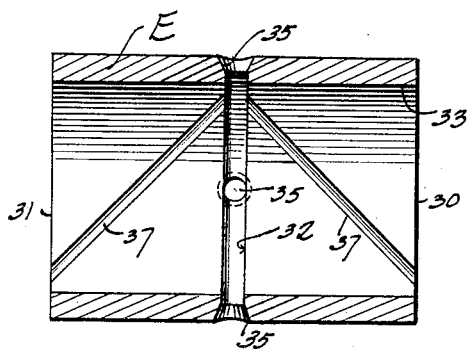
Figures 5 and 6 are longitudinal sectional views taken through an improved type of bushing for the bearing structure, looking in opposite directions.
Figure 6:
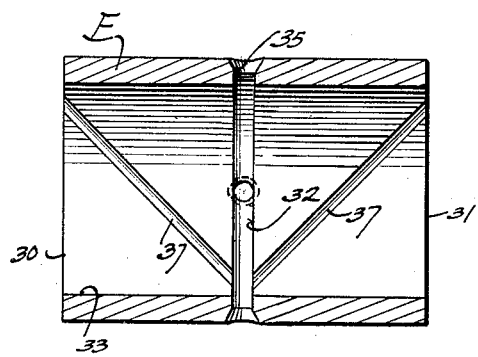

The bushing E comprises a machined bronze or other type sleeve, of approved thickness and it is fixed in the passageway 22, with its ends flush with the ends of the body 20, for abutment against the inner sides of the arms 10 and 11 of the frame B, when the pulley is in place on the pin C in the frame B. The bushing E is constructed in a novel manner for the feeding of lubricant from the well 25 to the inner bearing surfaces of the bushing. To this end, midway of the ends 30 and 31 of the bushing E, there is provided an annular groove 32 machined in the inner periphery 33 of the bushing, which is of considerable width. Intersecting this groove 32 are ports or apertures 35 which extend radially through the bushing E. These ports may be provided in any approved number, although preferably four of them are provided, in diametrically opposed pairs. Their function is to permit grease or lubricant to pass from the well 25 into the groove 32. These apertures or ports are of such diameter that the ring 40, to be subsequently described, will partly or fully cover them when said ring is lying against either side wall of the well 25. Any approved arrangement of grooves or ducts may be provided on the interior surface 33 of the bushing E. A preferred arrangement is that of providing spaced divergent pairs of ducts 37 extending from the groove 32 to the ends 30 and 31 of the bushing, as shown in Figures 5 and 6 of the drawings. One pair of these ducts 37 diverge in one direction and another pair diverge in an opposite direction, to insure longitudinal feed of lubricant from the groove 32 independent of the direction of relative rotation of the bearing parts.

The bushing E of course fits upon the shank 15 of the pin C, and with its ends in abutment with the arms 10 and 11 of the frame B the bushing, and also the sheave D are in proper relation to the frame and pin of the pulley block structure.

Figure 4:
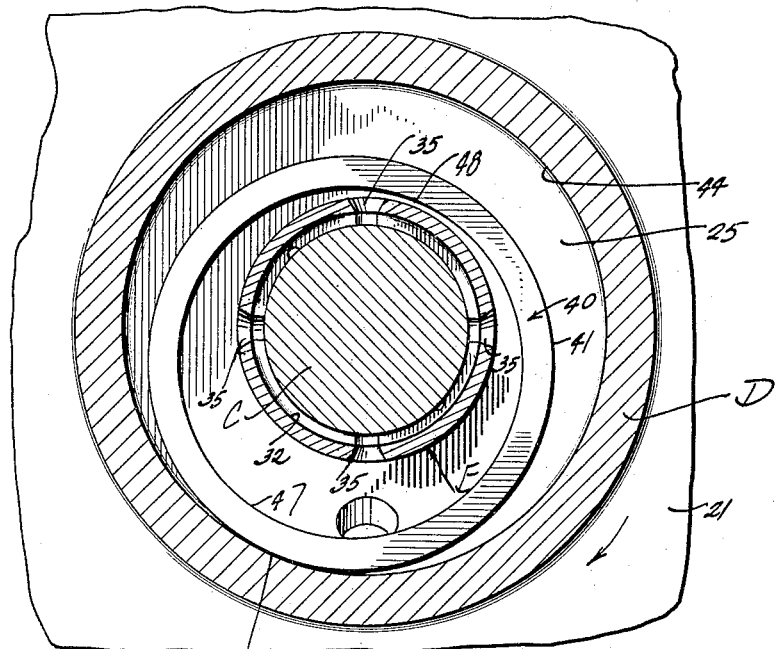
Figure 4 is an enlarged sectional view taken substantially on the line 4—4 of Figure 1.

With respect to the self-lubricating feature of the bearing, a comparatively heavy and rigid metal ring 40 preferably of endless formation, although not necessarily so, and of solid or laminated or built up construction of any approved material, loosely surrounds the shaft or pin C, and also the bushing E. In comparison to conventional oiling rings, the ring 40 is relatively thick and heavy, for the reason that it is peculiarly positioned in a mass of heavy grease or other viscid lubricant, such as graphite and grease in combination. The relation will be best understood by referring to Figure 4, wherein it is shown that the external diameter of the ring is such that the outer periphery 41 of the ring will touch at one point 42 on the inner periphery 44 of the well 25, and diametrically opposed thereto the periphery 41 is considerably spaced from the facing periphery 44 of the well. In this relation of parts it should be noted that the inner periphery 47 of the ring 40 at a point diametrically opposed from the contact point 42 is spaced as shown at 48 in the drawings, from the facing external periphery or surface of the bushing E. The ring 40 is of less width than the well 25, so that there is appreciable play of the ring in the well 25.

In the specific application of the lubricating arrangement to a pulley block, the pulley D is of course rotatable upon the bushing E. In heavy duty cargo pulley blocks of the type described it is well known that the block is swung horizontally, vertically and diagonally, and may operate for considerable periods in any of these positions. Normally the ring 40 becomes covered with the lubricant on its inner periphery through its motion in the grease or lubricant. The adhesiveness of the lubricant will cause the ring to rotate with the sheave at times without turning on its periphery. When the sheave is stopped suddenly the ring will continue to move from the force of inertia. When the sheave is stopped slowly the ring gravitates to the bottom of the well 25 and the lubricant between the ring and the bushing is forced through the ports 35 by the weight of the ring. During its normal vertical position the ring 40 will contact at times with the inner periphery 44 of the wall 25 of the pulley D. The rotation of the pulley D in the direction shown by the arrow in Figure 4 will cause the contact 42 to take place as indicated. Due to the eccentric position of the ring in the well 25, the grease or heavy lubricant will be forced between the inner periphery of the ring and the outer periphery of the bushing, laterally through the ducts 35 of the bushing and into the groove 32, and thence directed along the ducts 37 for lubricating the surfaces between the pin C and the bushing E, as is quite apparent. It is entirely conceivable that a bushing E need not be provided, and the feature still retained of causing movement of the ring 40 to take place by etxernal peripheral contact in the well 25 without any internal peripheral contact with the shaft. Due to lateral play of the ring 40 lubricant, independent of the position of the pulley D, that is, when off the vertical position, will be forced through the ports 35 in a manner which will be apparent to those skilled in the art.

Various changes in the shape, size, and arrangement of parts may be made to the form of invention herein shown and described, without departing from the spirit of the invention or the scope of the claims.

We claim:

1. In a bearing of the class described a shaft, a sleeve surrounding the shaft, said shaft and sleeve being mounted for relative rotation, the sleeve having an inner annular groove thereabout facing said shaft, said sleeve having transverse ports therethrough from the external surface thereof intersecting said groove, a part mounted on the sleeve and fixed therewith for rotation, said part having an annular chamber therein surrounding the sleeve and directly facing said ports, said chamber being adapted to receive lubricant, and a rigid lubricant feed ring loosely mounted in said annular chamber eccentrically surrounding said sleeve and said ports and having a peripheral width at least equal to the diameter of said ports.

2. In a bearing of the class described a shaft, a sleeve surrounding the shaft, said shaft and sleeve being mounted for relative rotation, the sleeve having an inner annular groove thereabout facing said shaft, said sleeve having transverse ports therethrough from the external surface thereof intersecting said groove, a part mounted on the sleeve and fixed therewith for rotation, said part having an annular chamber therein surrounding the sleeve and directly facing said ports, said chamber being adapted to receive lubricant, a lubricant feed ring loosely mounted in said annular chamber eccentrically surrounding said sleeve, said ring being of such circumference that it will contact only on its external periphery at a single point with the internal periphery of said annular chamber and a peripheral width substantially equal to the diameter of said ports.

GILBERT C. BOWN.
E. J. McCARTHY.